United States Patent [19]
Wright

[11] Patent Number: 5,249,442
[45] Date of Patent: Oct. 5, 1993

[54] EXHAUST PIPE LOCK FOR INTERNAL COMBUSTION ENGINES AND THE LIKE

[76] Inventor: Barrington Wright, 44 Metropolitan Oval, #4-A, Parkchester, N.Y. 10462

[21] Appl. No.: 801,277

[22] Filed: Dec. 2, 1991

[51] Int. Cl.$^5$ .............................................. B60R 25/00
[52] U.S. Cl. ......................................... 70/164; 70/237; 70/258; 180/287
[58] Field of Search .................. 70/163, 164, 166, 170, 70/237, 244, 258; 180/287

[56] References Cited

U.S. PATENT DOCUMENTS

| | | | |
|---|---|---|---|
| 972,853 | 10/1910 | Hambry et al. | 70/166 |
| 2,188,419 | 1/1940 | Saviteer | 70/166 |
| 3,782,146 | 1/1974 | Franke | 70/166 X |
| 4,683,735 | 8/1987 | Magrobi | 180/287 X |
| 4,696,368 | 9/1987 | Hummel et al. | 180/287 X |

FOREIGN PATENT DOCUMENTS

| | | | |
|---|---|---|---|
| 256846 | 8/1926 | United Kingdom | 70/371 |
| 2224539 | 5/1990 | United Kingdom | 70/258 |

*Primary Examiner*—Lloyd A. Gall
*Attorney, Agent, or Firm*—Richard L. Miller

[57] ABSTRACT

A lock is provided for an exhaust pipe in an exhaust system of an internal combustion engine in a motor vehicle, which consists of a plug to be inserted within a distal end of the exhaust pipe, so as to seal the distal end of the exhaust pipe and thereby prevent the operation of the internal combustion engine. A locking mechanism is also provided for retaining the plug within the distal end of the exhaust pipe and to prevent the unauthorized removal of the plug from the distal end of the exhaust pipe.

2 Claims, 1 Drawing Sheet

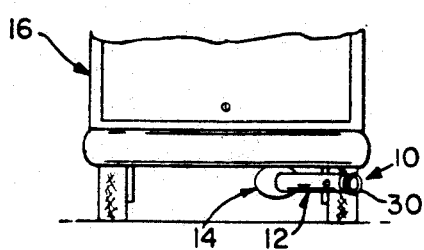
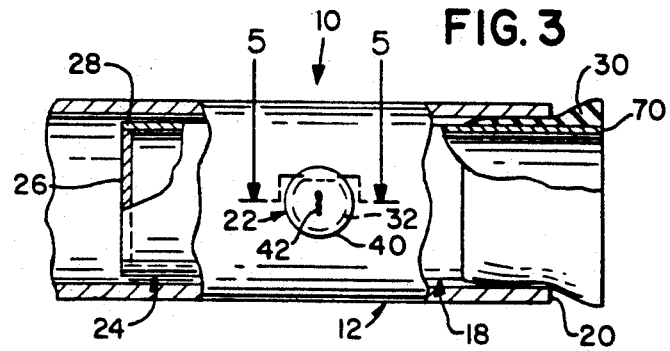
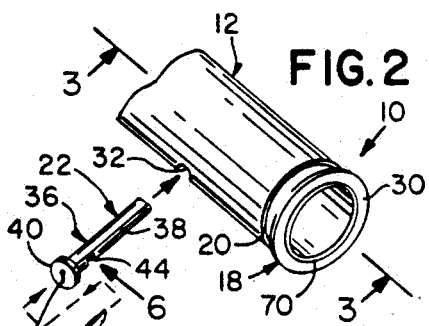
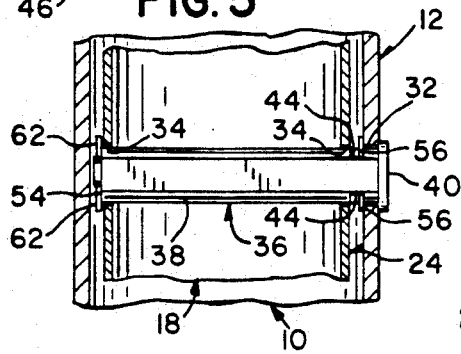
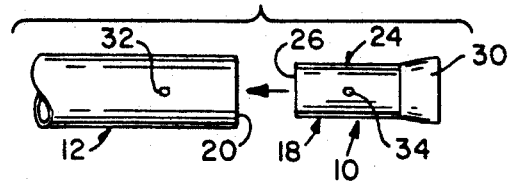
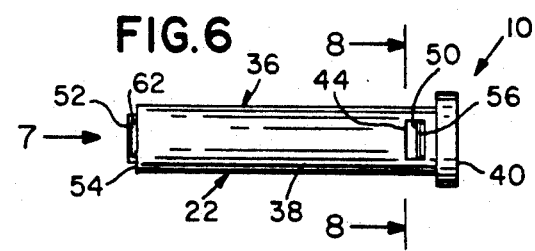
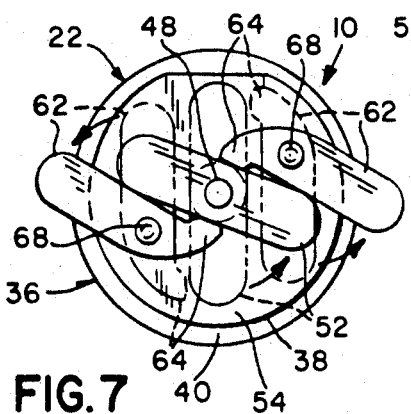
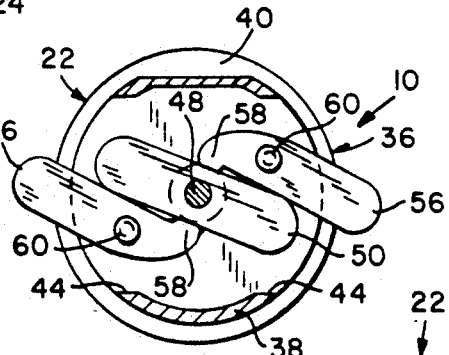
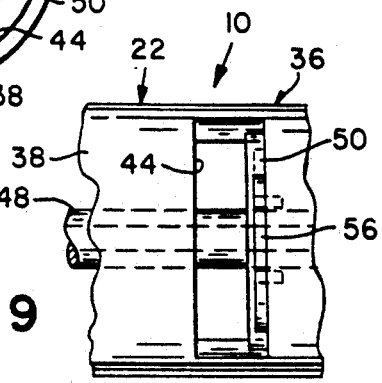

EXHAUST PIPE LOCK FOR INTERNAL COMBUSTION ENGINES AND THE LIKE

BACKGROUND OF THE INVENTION

The instant invention relates generally to anti-theft locking devices for motor vehicles and more specifically it relates to an exhaust pipe lock for an internal combustion engine and the like.

Numerous anti-theft locking devices for motor vehicles have been provided in the prior art that are adapted to shut down the engine of the motor vehicle so that it will not operate. For example, U.S. Pat. Nos. 3,680,656 to Leger; 3,700,063 to Dunseath and 4,690,240 to Russo all are illustrative of such prior art. While these units may be suitable for the particular purpose to which they address, they would not be as suitable for the purpose of the present invention as hereafter described.

SUMMARY OF THE INVENTION

A primary object of the present invention is to provide an exhaust pipe lock for an internal combustion engine and the like that will overcome the shortcomings of the prior art devices.

Another object is to provide an exhaust pipe lock for an internal combustion engine and the like that includes a plug which enters into the distal end of the exhaust pipe and there by prevents the operation of the internal combustion engine.

An additional object is to provide an exhaust pipe lock for an internal combustion engine and the like that utilizes a key operated lock cylinder that is transversely inserted through the end of the exhaust pipe and the plug to prevent the unauthorized removal of the plug from the distal end of the exhaust pipe.

A further object is to provide an exhaust pipe lock for internal combustion engine and the like that is simple and easy to use.

A still further object is to provide an exhaust pipe lock for internal combustion engine and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a partial rear view of a motor vehicle with the instant invention installed thereon;

FIG. 2 is a perspective view of an exhaust pipe with parts broken away and the instant invention partial installed therein;

FIG. 3 is a view partially in cross section taken in the direction of arrows 3—3 and on line 3—3 in FIG. 2;

FIG. 4 is a diagrammatic side view illustrating the instant invention being inserted into an exhaust pipe;

FIG. 5 is a view partially in cross section taken in the direction of arrows 5—5 and on line 5—5 in FIG. 3;

FIG. 6 is an enlarged plan view of just the keyed lock cylinder per se taken in the direction of arrow 6 in FIG. 2;

FIG. 7 is a still further enlarged end view of just the keyed lock cylinder per se taken in the direction of arrow 7 in FIG. 6;

FIG. 8 is a cross sectional view taken on line 8—8 in FIG. 6; and

FIG. 9 is an enlarged plan view, with parts broken away, of just the keyed lock cylinder per se.

DETAILED DESCRIPTION OF THE PREFERRED EMBODIMENTS

Turning now descriptively to the drawings, in which similar reference characters denote similar elements throughout the several views, the Figures illustrate a lock 10 for an exhaust pipe 12 in an exhaust system 14 of an internal combustion engine (not shown) in a motor vehicle 16, which consists of a plug 18 to be inserted within a distal end 20 of the exhaust pipe 12, so as to seal the distal end 20 of the exhaust pipe 12 so as to prevent the operation of the internal combustion engine. A retaining mechanism 22 is for retaining the plug 18 within the distal end 20 of the exhaust pipe 12 and to prevent the unauthorized removal of the plug 18 from the distal end 20 of the exhaust pipe 12.

The plug 18 includes a hollow cylindrical sleeve 24 sized to fit within the distal end 20 of the exhaust pipe 12. A disc-shaped plate 26 is to cap a first end 28 of the sleeve 24. A resilient stopper 30 fits over a second end 70 of the sleeve 24, so that when the sleeve 24 is inserted within the distal end 20 of the exhaust pipe 12, the stopper 30 will seal the distal end 20 of the exhaust pipe 12 and prevent the exhausted gases from exiting therefrom.

The retaining mechanism 22 includes the exhaust pipe 12 having a transverse aperture 32 at a predetermined distance from the distal end 20 thereof. The sleeve 24 of the plug 18 has two aligned transverse keyed apertures 34 at a predetermined distance from the stopper 30. When the sleeve 24 is inserted within the distal end 20 of the exhaust pipe 12, the two aligned transverse apertures 34 will line up with the transverse aperture 32 in the exhaust pipe 12. A keyed lock cylinder 36 is insertable through the transverse aperture 32 in the exhaust pipe 12 and the two aligned transverse keyed apertures 34 in said sleeve 24, so that when the lock cylinder 36 is operated it will retain the sleeve 24 therein.

The keyed lock cylinder 36 includes an elongated keyed cylindrical housing 38 having an enlarged head 40 with a keyway 42 therein and a pair of slotted sides 44 at a predetermined distance from the enlarged head 40. A key 46 is insertable within the keyway 42 to operate the lock cylinder 36. A shaft 48 extends through the housing 38 and is operable by turning the key 36 within the keyway 42. A pair of cams 50 and 52 are provided, with the first cam 50 affixed to the shaft 48 at the slotted side 44 of the housing 38. The second cam 52 is affixed to the shaft 48 at the rear 54 of the housing 38. A first pair of fingers 56 are also provided with each having a cam cooperating surface 58 and pivotally mounted at rivet 60 to the housing 38 on opposite sides of the first cam 50. A second pair of fingers 62 are also provided, with each having a cam cooperating surface 64 and pivotally mounted at rivet 68 to the housing 38 on opposite sides of the second cam 52. After the housing 38 is inserted through the transverse aperture 32 in the exhaust pipe 12 and the two aligned transverse keyed apertures 34 in the sleeve 24, the key can be turned in the keyway 42 and removed. This causes the pair of cams 50 and 52 to turn, forcing the first pair of fingers 56 to extend outwardly through the slotted sides 44 in the housing 38 behind the transverse aperture 32 in the exhaust pipe 12 and forcing the second pair of fingers 62 to extend outwardly from the rear 54 of the housing 38 in front of the second aligned transverse keyed aperture 34 in the sleeve 24, preventing the keyed lock cylinder 36 and the plug 18 from the distal end 20 of the exhaust pipe 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A lock for an exhaust pipe in an exhaust system of an internal combustion engine in a motor vehicle, which comprises:
    a) a plug to be inserted within a distal end of the exhaust pipe, so as to seal the distal end of the exhaust pipe and thereby prevent the operation of the internal combustion engine; and
    b) means for retaining said plug within the distal end of the exhaust pipe and to prevent the unauthorized removal of said plug from the distal end of the exhaust pipe, wherein said plug includes:
        i) a hollow cylindrical sleeve sized to fit within the distal end of the exhaust pipe;
        ii) a disc-shaped plate to cap a first end of said sleeve; and
        iii) a resilient stopper to fit over a second end of said sleeve so that when said sleeve is inserted within the distal end of the exhaust pipe, said stopper will seal the distal end of the exhaust pipe and prevent the exhausted gases from exiting therefrom, and wherein said retaining means includes:
        i) the exhaust pipe having a transverse aperture at a predetermined distance from the distal end thereof;
        ii) said sleeve of said plug having two aligned transverse keyed apertures at a predetermined distance from said stopper, so that when said sleeve is inserted within the distal end of the exhaust pipe, the two aligned transverse apertures will line up with the transverse aperture in the exhaust pipe; and
        iii) a keyed lock cylinder insertable through the transverse aperture in the exhaust pipe and the two aligned transverse keyed apertures in said sleeve, so that when said lock cylinder is operated it will retain said sleeve therein.

2. A lock as recited in claim 1, wherein said keyed lock cylinder includes:
    a) an elongated keyed cylindrical housing having an enlarged head with a keyway therein and a pair of slotted sides at a predetermined distance from the enlarged head;
    b) a key insertable within the keyway to operate said lock cylinder;
    c) a shaft extending through said housing and operable by turning said key within the keyway;
    d) a pair of cams, with said first cam affixed to said shaft at the slotted sides of said housing and said second cam affixed to said shaft at the rear of said housing;
    e) a first pair of fingers, each having a cam cooperating surface and pivotally mounted to said housing on opposite sides of said first cam; and
    f) a second pair of fingers, each having a cam cooperating surface and pivotally mounted to said housing on opposite sides of said second cam, so that after said housing is inserted through the transverse aperture in the exhaust pipe and the two aligned transverse keyed apertures in said sleeve, the key can be turned in the keyway and removed, thereby causing said pair of cams to turn, forcing said first pair of fingers to extend outwardly through the slotted sides in said housing behind the transverse aperture in the exhaust pipe and forcing said second pair of fingers to extend outwardly from the rear of said housing in front of the second aligned transverse keyed aperture in said sleeve, preventing the removal of said keyed lock cylinder and said plug from the distal end of the exhaust pipe.

* * * * *